3,222,407
PRODUCTION OF VINYL CHLORIDE
Harry S. Leach and Glenn C. Marken, Texas City, Tex., assignors to Monsanto Company, a corporation of Delaware
No Drawing. Filed Mar. 8, 1962, Ser. No. 178,282
2 Claims. (Cl. 260—656)

The present invention relates to the thermal cracking of ethylene dichloride to produce vinyl chloride.

It is well known that vinyl chloride can be produced by thermal cracking of ethylene dichloride. It is also well known that gaseous oxygen, chlorine and bromine are catalysts for this reaction. In the catalyzed cracking process, minor amounts of other products are produced which are extremely difficult to remove from the vinyl chloride product in the usual purification processes. Yet it is necessary that these impurities be substantially removed since process efficiency in polymerization of the vinyl chloride monomer is hampered by their presence. Specifications for vinyl chloride suitable for commerce are, therefore, quite rigid with respect to impurities which can be tolerated in the monomeric material. One of the impurities known to be present in vinyl chloride derived from ethylene dichloride is methyl chloride. Ordinary purification means do not adequately remove this impurity to the level at which it can be considered to be entirely innocuous in product vinyl chloride. Now, however, it has been discovered that the level of this impurity can be significantly reduced by a modification of the cracking process. The method has the added advantage that it eliminates any after-treatment of the monomer required for removal of this particular impurity.

It is, therefore, an object of this invention to provide a more efficient process for the production of vinyl chloride by the cracking of ethylene dichloride. It is a further object of the invention to provide a novel process for the cracking of ethylene dichloride to vinyl chloride wherein the amount of methyl chloride in the cracking product is substantially reduced and the necessity for subjecting the product to a treatment for removal of this impurity is obviated.

These and other objects and advantages of the invention which will become obvious from the following description thereof are achieved by subjecting ethylene dichloride to cracking in the presence of a homogeneous catalyst such as chlorine and in the presence of a minor amount of carbon tetrachloride. The amount of carbon tetrachloride employed should be in the range from about 100 parts by weight per million parts by weight of ethylene dichloride to about 2,500 parts by weight per million parts of ethylene dichloride.

The invention is illustrated in the following example which, however, is not to be construed as limiting it in any manner whatsoever.

Example 1

Ethylene dichloride was pyrolyzed in the presence of chlorine alone and in the presence of chlorine and small amounts of carbon tetrachloride. The reactor employed consisted of a ¾-in. O.D. stainless steel tube about 11.3 inches long wrapped with asbestos tape and nichrome wire for heating disposed within a muffle furnace and provided with inlet and outlet manifolds. The liquid ethylene dichloride was passed through a rotameter, vaporized, passed through two preheaters and then through the reactor which was maintained at a temperature of approximately 500° C. at a rate such as to provide a residence time of about 0.2 second in the heated reactor. The ethylene dichloride vapor stream was diluted by the addition of 65% by volume of preheated helium at a point between the second preheater and the reactor. Approximately 1% by weight of chlorine was injected into the ethylene dichloride vapor stream just prior to its introduction into the reactor. When carbon tetrachloride was used, it was added to the liquid ethylene dichloride feed. The process was carried out continuously over a period of about two hours. Samples of the effluent gas were collected in evacuated sampling bombs and the gas was subjected to gas chromatographic analysis for determination of its methyl chloride content. Results of the series of runs made in which varying amounts of carbon tetrachloride were introduced into the feed stream to the reactor, together with the standard runs in which no carbon tetrachloride was introduced are presented in the following table. All parts given are by weight.

TABLE I

| Run No. | Amt. of CCl₄ In Feed (p.p.m.) | Conv. (percent) | Amount of Methyl Chloride in Effluent Gas (Parts per Million Parts of Vinyl Chloride) |
|---|---|---|---|
| 44 | None | 14.5 | 162 |
| 45 | 100 | 17.6 | 75 |
| 47 | None | 18.2 | 98 |
| 48 | 100 | 19.3 | 45 |
| 50 | None | 18.7 | 103 |
| 51 | 500 | 19.5 | 39 |
| 55 | None | 18.2 | 97 |
| 57 | 500 | 18.1 | 27 |
| 58 | 5,000 | 17.7 | 194 |

It will be seen from these data that as little as 100 p.p.m. of carbon tetrachloride introduced in the chlorine-catalyzed pyrolysis of ethylene dichloride effectively reduces the methyl chloride content of the effluent gas to a level about one-half that obtained when carbon tetrachloride is not present. It is also evident that the amount of carbon tetrachloride employed is critical since at a level of concentration of 5,000 p.p.m., it has no effect whatever in suppressing the production of methyl chloride but in fact appears to accelerate the production of this impurity. Based on the data obtained, the effective range of addition of carbon tetrachloride lies between about 100 and 2,500 parts per million. Preferably, the amount of carbon tetrachloride to be introduced in the cracking reaction is in the range from about 100 parts per million to about 500 parts per million.

The carbon tetrachloride is preferably introduced into the ethylene dichloride before the dichloride is charged to the reactor. It may be mixed as a liquid with a liquid ethylene dichloride feed before the latter is vaporized or it may be injected into the gaseous ethylene dichloride either in the preheaters or at any point prior to the introduction of the gaseous stream into the reactor.

Variations in reaction conditions from those given in the example may be made without departing from the scope of the invention. Reaction conditions may be any of those customarily used in the art. Cracking temperatures employed may be those in the range, for example, from about 350° to 600° C. but preferably the cracking temperature is maintained at a temperature from about 400° to about 500° C. Residence times of 0.1 to 30 seconds in the reaction zone may be employed. Preferably, residence times from about 2 to about 10 seconds are used.

The amounts of chlorine catalyst can vary from about 0.05% to about 5% by weight of the ethylene dichloride. Preferred amounts are those from about 1% to about 2%. The chlorine can be added before or as the stream enters the reactor or even in a number of separate streams at different points along the reaction zone.

While a diluent gas was employed in the example to facilitate reaction control, one is not required. Where diluents are employed, any gas inert under the reaction conditions such as helium, nitrogen, argon, etc., can be used.

The reactor is preferably constructed of alloys rich in iron. Alloys rich in nickel also have proven particularly useful.

What is claimed is:

1. In a process wherein ethylene dichloride is pyrolyzed at temperatures in the range from about 350° to about 600° C. in the presence of from about 0.5 to about 5% by weight of chlorine based on the ethylene dichloride, the improvement which comprises conducting said pyrolysis in the presence of from about 100 parts to about 2,500 parts of carbon tetrachloride per million parts of ethylene dichloride.

2. In a process wherein ethylene dichloride is pyrolyzed at a temperature of about 500° C. in the presence of about 1% by weight of chlorine based on the ethylene dichloride, the improvement which comprises conducting said pyrolysis in the presence of from about 100 parts to about 500 parts of carbon tetrachloride per million parts of ethylene dichloride.

References Cited by the Examiner
UNITED STATES PATENTS 2,378,859 6/1945 Mudgan et al. _____ 260—656
2,755,315 7/1956 Eberly _____ 260—656

LEON ZITVER, *Primary Examiner.*